United States Patent
Malone-Jones et al.

(10) Patent No.: US 10,206,442 B1
(45) Date of Patent: Feb. 19, 2019

(54) TURN SIGNAL RIDING GLOVES

(71) Applicants: Kimberly Malone-Jones, Hampton, VA (US); Rufus Jones, Hampton, VA (US)

(72) Inventors: Kimberly Malone-Jones, Hampton, VA (US); Rufus Jones, Hampton, VA (US)

( * ) Notice: Subject to any disclaimer, the term of this patent is extended or adjusted under 35 U.S.C. 154(b) by 20 days.

(21) Appl. No.: 15/358,246

(22) Filed: Nov. 22, 2016

(51) Int. Cl.
| | | |
|---|---|---|
| *B60Q 1/34* | (2006.01) | |
| *B60Q 1/44* | (2006.01) | |
| *A41D 19/015* | (2006.01) | |
| *B60Q 1/26* | (2006.01) | |
| *B62J 6/00* | (2006.01) | |

(52) U.S. Cl.
CPC ....... *A41D 19/0157* (2013.01); *B60Q 1/2673* (2013.01); *B60Q 1/343* (2013.01); *B60Q 1/44* (2013.01); *B62J 6/005* (2013.01); *B62J 2300/008* (2013.01)

(58) Field of Classification Search
CPC .. A41D 19/0157; B60Q 1/2673; B60Q 1/343; B60Q 1/44; B62J 2006/006; B62J 2006/008; B62J 6/005; F21V 33/0008
See application file for complete search history.

(56) References Cited

U.S. PATENT DOCUMENTS

| | | |
|---|---|---|
| 7,013,490 B2 | 3/2006 | Senter |
| 7,347,578 B1 | 3/2008 | Nourse |
| 7,503,667 B2 | 3/2009 | Wilkings |
| 7,959,314 B1 | 6/2011 | Rodriguez |
| D664,058 S | 7/2012 | Robinson |
| 8,485,681 B2 | 7/2013 | Richter |
| 2008/0218996 A1 | 9/2008 | Chalgren |
| 2012/0069552 A1* | 3/2012 | Richter ............... F21V 33/0008 362/103 |
| 2016/0338172 A1* | 11/2016 | Fern ................... H05B 37/0272 |

\* cited by examiner

*Primary Examiner* — Anh T Mai
*Assistant Examiner* — Steven Y Horikoshi

(57) ABSTRACT

The turn signal riding gloves is a pair of gloves with lights integrated into an exterior surface that form turn signals or a braking signal light. Each of the pair of gloves operates independent of one another. Each of the pair of gloves includes a powering member that is wired in between a plurality of buttons and the plurality of lights. The plurality of buttons may be linearly aligned along a side surface of an index finger of the respective glove. In use, the motorcyclist simply raises an applicable hand and corresponding glove into the air, and pressing one of the plurality of buttons in order to generate a brake light signal, left turn signal, or right turn signal.

13 Claims, 3 Drawing Sheets

TURN SIGNAL RIDING GLOVES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of gloves for riding motorcycles, more specifically, a pair of gloves that include signaling-lights thereon, which is adapted to be used as an illuminated turn signal for a motorcycle rider.

Motorcyclists are more likely to be injured in an accident than when compared to a non-motorcycling motorist. The severity and level of injury is also amplified when comparing a motorcyclist involved in an accident with a non-motorcycling counterpart.

Accidents between motorcyclists and non-motorcycling motorists are often attributed to visibility. Motorcycles are much smaller in size when compared to cars. Motorcycles typically include turn signals on either side, but said turn signals are relatively low to the ground, and may be smaller in size when compared to turn signals of cars.

What is needed and is accomplished via the patent application at bar, is a pair of gloves that the motorcyclist is able to wear, and which includes lights on an exterior surface of the gloves. The lights on the exterior surface of the gloves generate different turn signals and/or flashing signals to warn nearby motorist of the braking or turning of the motorcycle.

SUMMARY OF INVENTION

The turn signal riding gloves is a pair of gloves with lights integrated into an exterior surface that form turn signals or a braking signal light. Each of the pair of gloves operates independent of one another. Each of the pair of gloves includes a powering member that is wired in between a plurality of buttons and the plurality of lights. The plurality of buttons may be linearly aligned along a side surface of an index finger of the respective glove. The plurality of buttons enables a user to depress one of the plurality of buttons via a thumb of the corresponding hand that is wearing the respective glove. The plurality of buttons control operation of the braking light signal or the different turn signals provided on the exterior surface of the glove. In use, the motorcyclist simply raises an applicable hand and corresponding glove into the air, and pressing one of the plurality of buttons in order to generate a brake light signal, left turn signal, or right turn signal.

It is an object of the invention to provide a pair of gloves with lights integrated into the construction of the pair of gloves, and said lights being selectively illuminated in order to generate different signals for use via a motorcyclist in riding a respective motorcycle.

A further object of the invention is to provide buttons on each of the pair of gloves in order to designate a selected signal to be generated via the plurality of lights.

Another object of the invention is for the pair of gloves to operate independent of one another such that a motorcyclist may at his or her discretion elect to wear only a left glove, only a right glove, or both gloves simultaneously.

These together with additional objects, features and advantages of the turn signal riding gloves will be readily apparent to those of ordinary skill in the art upon reading the following detailed description of the presently preferred, but nonetheless illustrative, embodiments when taken in conjunction with the accompanying drawings.

In this respect, before explaining the current embodiments of the turn signal riding gloves in detail, it is to be understood that the turn signal riding gloves is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the turn signal riding gloves.

It is therefore important that the claims be regarded as including such equivalent construction insofar as they do not depart from the spirit and scope of the turn signal riding gloves. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
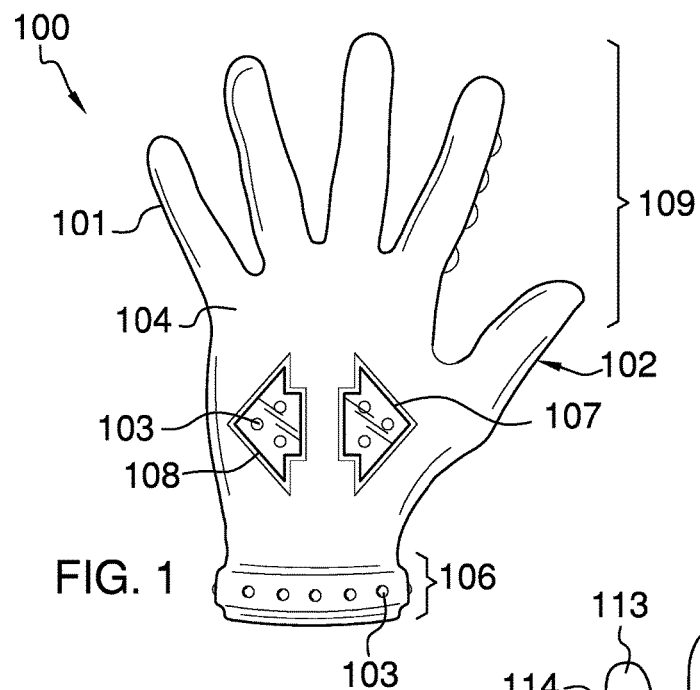
FIG. 1 is a rear view of an embodiment of the disclosure.
Figure 2:
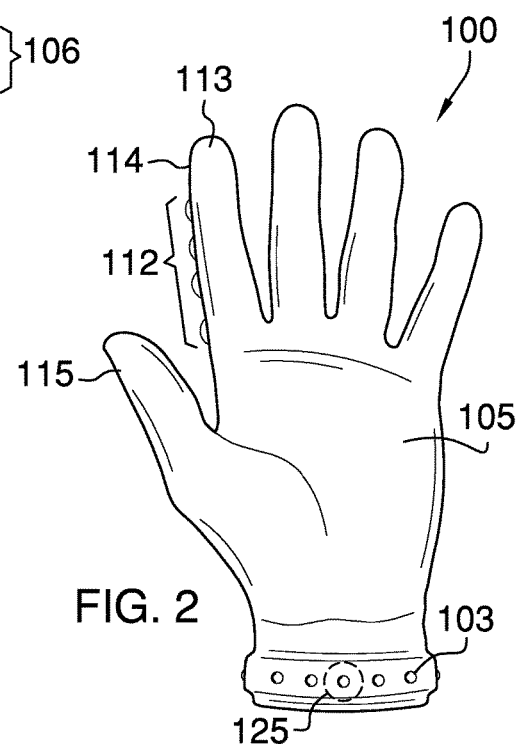
FIG. 2 is a front view of an embodiment of the disclosure.
Figure 3:
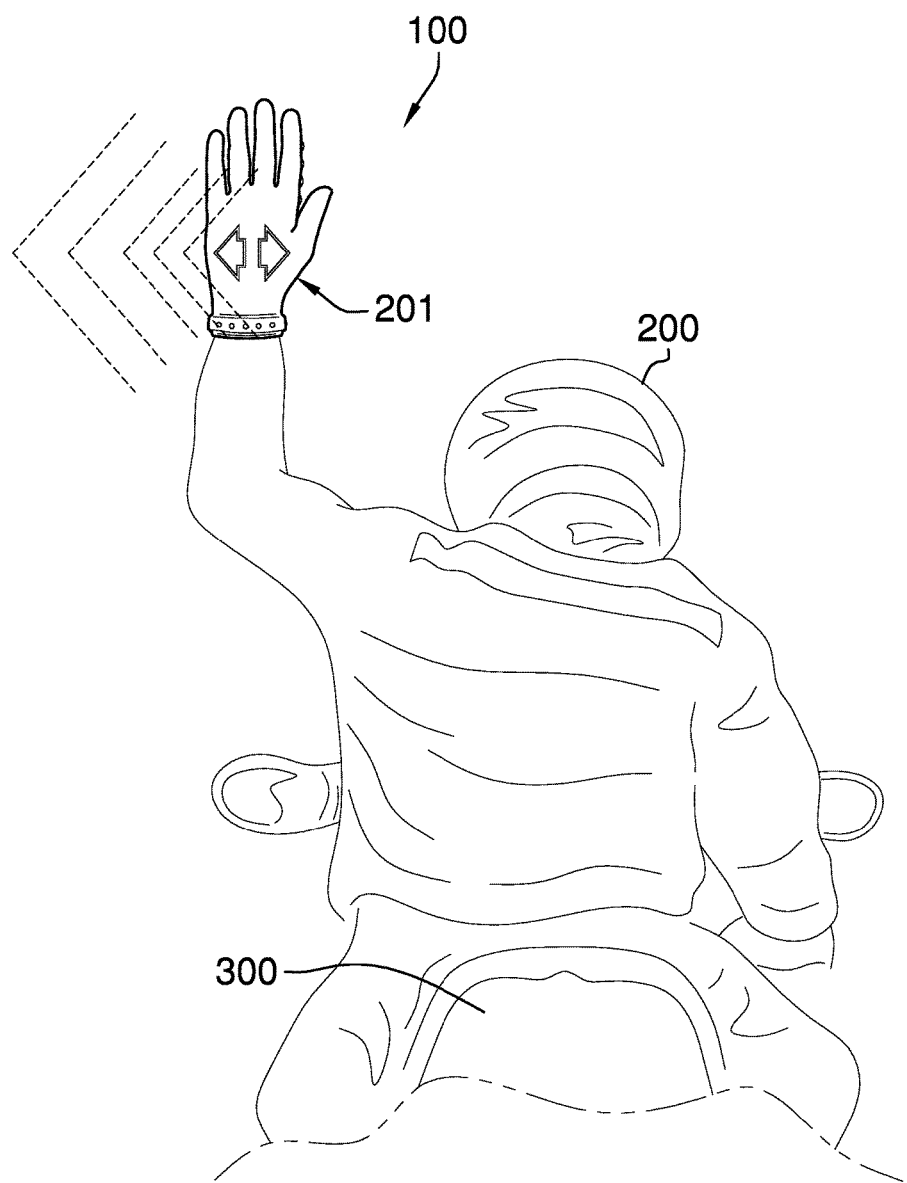
FIG. 3 is a view of an embodiment of the disclosure in use.
Figure 4:
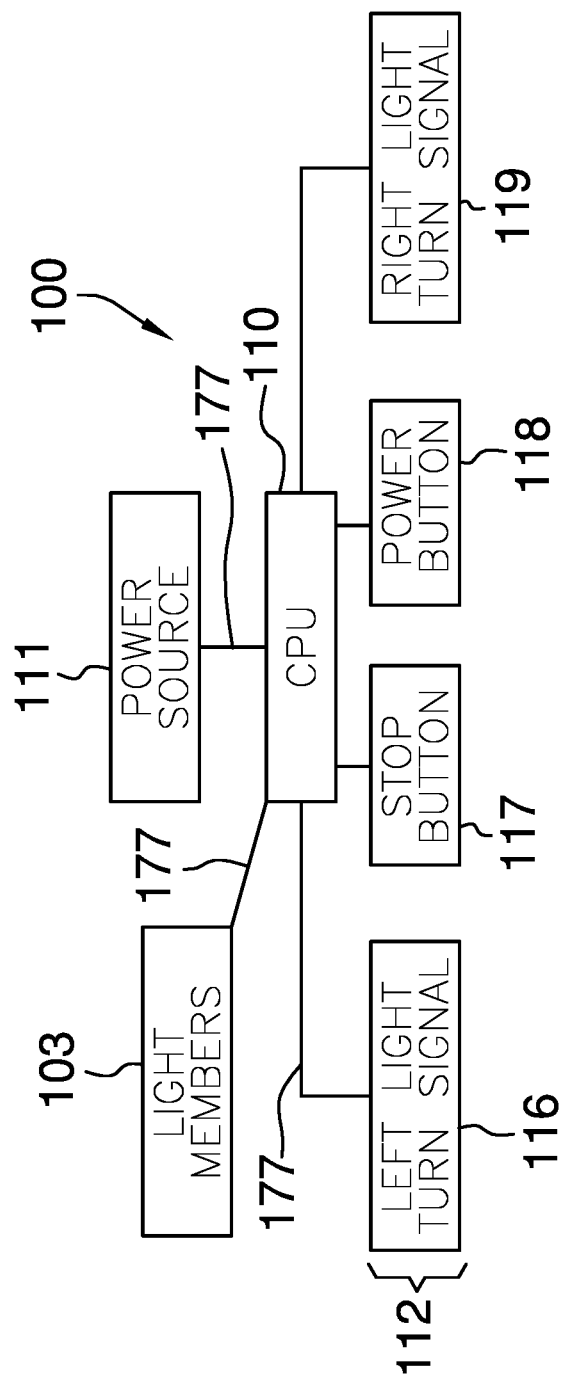
FIG. 4 is a block diagram of componentry associated with an embodiment of the disclosure.

Detailed reference will now be made to a plurality of potential embodiments of the disclosure, which are illustrated in FIGS. 1 through 4.

The turn signal riding gloves 100 (hereinafter invention) further comprises a glove 101. The glove 101 may be one of a pair (not depicted). Moreover, the glove 101 may be for a left hand or a right hand. The glove 101 is adapted to be worn on a hand 201 of an end user 200 whilst said end user 200 is operating a motorcycle 300. The glove 101 may be made of a flexible fabric, leather, or other material typically associated with glove construction.

The glove 101 is further defined with an outer surface 102 that has a plurality of light members 103 integrated thereon. The plurality of light members 103 may involve the use of light emitting diodes. Moreover, the plurality of light members 103 form different signals that are visible to nearby motorists. The outer surface 102 of the glove 101 is further defined as a rear glove surface 104 and a palm glove surface 105. The palm glove surface 105 is opposite of the rear glove surface 104.

The plurality of light members 103 are collectively used to generate different signals that are visible to nearby motorists. Moreover, the plurality of light members 103 are provided along a wrist portion 106 of the glove 101 as well as at different locales on the rear glove surface 104. A left signal arrow 108 and a right signal arrow 107 are provided on the rear glove surface 104. The left signal arrow 108 and the right signal arrow 107 are provided between the wrist portion 106 and a finger portion 109 of the glove 101.

The left signal arrow 108 indicates the motorcycle 300 is making a left turn. The right signal arrow 107 indicates the motorcycle 300 is making a right turn. The plurality of light members 103 located along the wrist portion 106 indicate the motorcycle 300 is braking. It shall be noted that the plurality of light members 103 provided at the wrist portion 106 of the glove 101 encircle the glove 101.

The plurality of light members 103 is in wired connection with a CPU 110 that in turn is in wired connection with a power source 111. The power source 111 is ideally at least one battery, and provides the electrical needs of the invention 100. The CPU 110 is also in wired connection with a plurality of buttons 112. The plurality of buttons 112 are uniquely located on an index finger 113 of the glove 101. Moreover, the index finger 113 is further defined with a lateral surface 114 along which the plurality of buttons 112 is provided. It shall be noted that the lateral surface 114 of the index finger 113 faces a thumb finger 115 of the glove 101.

In use, the thumb finger 115 of the glove 101 is used to depress one of the plurality of buttons 112 provided on the index finger 113 in order to signal the CPU 110. It shall be noted that the plurality of buttons 112 are linearly aligned along the lateral surface 114 of the index finger 113. The plurality of buttons 112 may be further defined as a left light turn signal 116, a stop button 117, a power button 118, and a right light turn signal 119. It shall be noted that the plurality of buttons 112 may be arranged differently, but shall remain linear in arrangement.

The power button 118 turns on the invention 100. Depressing the left light turn signal 116 illuminates the left signal arrow 108. Depression of the left light turn signal 116 a second time turns off the left signal arrow 108. In use, the plurality of light members 103 of the left turn signal 108 may flash or remain on until turned off. The same can be said of the right turn signal 107 and the plurality of light members 103 at the wrist portion 106.

Wiring 177 from the CPU 110 to the plurality of light members 103, the plurality of buttons 112, and the power source shall be integrated into the construction of the glove 101. The wiring 177 may be grouped according to the different signals generated via the plurality of light members 103. The power source 111 may be housed within a battery compartment 125. The battery compartment 125 may be provided anywhere on the glove 101, but is depicted at the wrist portion 106. The power source 110 is ideally a battery, which may be rechargeable. The power source 110 is able to be accessed via the battery compartment 125 as needed.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A signaling device comprising:
   a glove that is adapted to be worn on a hand of an end user whilst said end user operates a motorcycle;
   wherein said glove includes different signals that are integrated onto an outer surface of said glove, and said different signals being adaptively used via the end user to alert nearby motorists of braking or turning of the respective motorcycle;
   wherein the glove is further defined with a plurality of light members that are integrated into the outer surface to form the different signals;
   wherein the outer surface of the glove is further defined as a rear glove surface and a palm glove surface;
   wherein the palm glove surface is opposite of the rear glove surface;
   wherein the plurality of light members are provided along a wrist portion of the glove as well as at different locales on the rear glove surface;
   wherein a left signal arrow and a right signal arrow are provided on the rear glove surface;
   wherein the left signal arrow and the right signal arrow are provided between the wrist portion and a finger portion of the glove;
   wherein the left signal arrow is adapted to indicate the motorcycle is making a left turn;
   wherein the right signal arrow is adapted to indicate the motorcycle is making a right turn;
   wherein the plurality of light members located along the wrist portion are adapted to indicate the motorcycle is braking;
   wherein the plurality of light members provided at the wrist portion of the glove encircle the glove.

2. The signaling device according to claim 1 wherein the plurality of light members consist of light emitting diodes.

3. The signaling device according to claim 1 wherein the plurality of light members is in wired connection with a CPU that in turn is in wired connection with a power source.

4. The signaling device according to claim 3 wherein the power source is further defined as at least one battery, which provides electricity for the CPU and the plurality of light members.

5. The signaling device according to claim 4 wherein the CPU is in wired connection with a plurality of buttons.

6. The signaling device according to claim 5 wherein the plurality of buttons are located on an index finger of the glove.

7. The signaling device according to claim 6 wherein the index finger is further defined with a lateral surface along which the plurality of buttons is provided; wherein the later surface of the index finger faces a thumb finger of the glove; wherein the thumb finger of the glove is used to depress one of the plurality of buttons provided on the index finger in order to signal the CPU.

8. The signaling device according to claim 7 wherein the plurality of buttons are linearly aligned along the lateral surface of the index finger.

9. The signaling device according to claim 8 wherein the plurality of buttons is further defined as a left light turn signal, a stop button, a power button, and a right light turn signal; wherein the power button turns on the signaling device; wherein depressing the left light turn signal illuminates the left signal arrow; wherein depression of the left light turn signal a second time turns off the left signal arrow; wherein depressing the right light turn signal illuminates the right signal arrow; wherein depression of the right light turn signal a second time turns off the right signal arrow; wherein depressing the stop button illuminates the plurality of light members at the wrist portion; wherein depression of the stop button a second time turns off the plurality of light members at the wrist portion.

10. The signaling device according to claim 9 wherein the plurality of light members either flash or remain illuminated until turned off.

11. The signaling device according to claim 10 wherein wiring extends from the CPU to the plurality of light members, the plurality of buttons, and the power source; wherein said wiring is integrated into the construction of the glove.

12. The signaling device according to claim 11 wherein the power source is housed within a battery compartment.

13. The signaling device according to claim 12 wherein the battery compartment is provided at the wrist portion of the glove.

* * * * *